United States Patent
Crosbie et al.

(10) Patent No.: US 9,286,599 B2
(45) Date of Patent: Mar. 15, 2016

(54) REDACTING CONTENT IN ONLINE MEETINGS

(75) Inventors: Mark Crosbie, Malahide (IE); Juan Galiana Lara, Temple Court (IE); Patrick Joseph O'Sullivan, Ballsbridge (IE); Annette Suzanne Hoag Riffe, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 13/172,484

(22) Filed: Jun. 29, 2011

(65) Prior Publication Data

US 2013/0007123 A1 Jan. 3, 2013

(51) Int. Cl.
*G06F 15/16* (2006.01)
*G06Q 10/10* (2012.01)
*H04L 29/06* (2006.01)
*H04W 12/02* (2009.01)

(52) U.S. Cl.
CPC ............ *G06Q 10/101* (2013.01); *H04L 63/107* (2013.01); *H04W 12/02* (2013.01)

(58) Field of Classification Search
CPC .............................. H04L 51/12; H04L 63/107
USPC ......................................................... 709/204
See application file for complete search history.

(56) References Cited

U.S. PATENT DOCUMENTS

| | | | |
|---|---|---|---|
| 6,697,365 B1 * | 2/2004 | Messenger | 370/390 |
| 7,240,015 B1 * | 7/2007 | Karmouch | G06F 9/4875 705/4 |
| 7,299,405 B1 | 11/2007 | Lee et al. | |
| 7,802,305 B1 * | 9/2010 | Leeds | 726/26 |
| 7,861,176 B2 * | 12/2010 | Weisberg | 715/758 |
| 8,621,352 B2 * | 12/2013 | Ding | G06F 3/1454 709/204 |
| 2002/0111845 A1 * | 8/2002 | Chong | G06Q 10/06311 705/7.13 |
| 2003/0188085 A1 * | 10/2003 | Arakawa et al. | 711/100 |
| 2006/0026502 A1 | 2/2006 | Dutta | |
| 2007/0014428 A1 * | 1/2007 | Kountchev et al. | 382/100 |

(Continued)

FOREIGN PATENT DOCUMENTS

WO 2006 127430 A1 11/2006

OTHER PUBLICATIONS

Razavi et al., "Supporting Selective Information Sharing with People-Tagging," http://portal.acm.org/purchase.cfj?id=1358868 &CFID=6546166&CFTOKEN=9208305, downloaded Jun. 27, 2011, pp. 1 (abstract only).

(Continued)

*Primary Examiner* — Christopher Biagini
*Assistant Examiner* — Keyvan Emdadi
(74) *Attorney, Agent, or Firm* — Brian J. Colandreo, Esq.; Jeffrey T. Placker, Esq.; Holland & Knight LLP

(57) ABSTRACT

A method, computer program product, and system for redacting content in online meetings is described. A method may comprise receiving, via one or more computing devices, a selected portion of content to redact in a first online meeting. The method may further comprise determining, via the one or more computing devices, if a participant of the first online meeting is in an un-trusted location. The method may additionally comprise, in response to determining that the participant of the first online meeting is in the un-trusted location, redacting, via the one or more computing devices, the selected portion of content from content available to the participant in the first online meeting.

25 Claims, 7 Drawing Sheets

(56) References Cited

U.S. PATENT DOCUMENTS

| | | | |
|---|---|---|---|
| 2007/0136338 A1* | 6/2007 | Kaler et al. | 707/101 |
| 2007/0260649 A1* | 11/2007 | Chakra et al. | 707/204 |
| 2008/0282356 A1 | 11/2008 | Grabarnik et al. | |
| 2009/0113346 A1* | 4/2009 | Wickramasuriya et al. | 715/825 |
| 2009/0210547 A1* | 8/2009 | Lassen et al. | 709/230 |
| 2009/0234667 A1 | 9/2009 | Thayne | |
| 2010/0033753 A1* | 2/2010 | Stephenson | 358/1.15 |
| 2010/0262925 A1 | 10/2010 | Liu et al. | |
| 2010/0312658 A1* | 12/2010 | Lloveras Calvo | 705/17 |
| 2011/0038483 A1* | 2/2011 | Goeller et al. | 380/282 |
| 2012/0023168 A1* | 1/2012 | Koren | 709/204 |
| 2013/0040657 A1* | 2/2013 | Jackson | G06F 21/84 455/456.1 |

OTHER PUBLICATIONS http://www.allegria.com/products/ereview.htm, downloaded Jun. 29, 2011, pp. 1-2.

* cited by examiner

REDACTING CONTENT IN ONLINE MEETINGS

BACKGROUND OF THE INVENTION

Online meeting participants may be traveling or may otherwise be in non-office locations. These participants may view content of the online meeting on a screen that is in a public location such as, for example, an airport, train station, or hotel lobby. Participants engaged in online meetings in these non-office locations may pose a security risk, as sensitive data may be displayed on the screen viewed by the participant. As such, the sensitive data may be viewed by people without permission, as they may glance at the screen viewed by the participant in the public location.

BRIEF SUMMARY OF THE INVENTION

In an embodiment, a method may include receiving, via one or more computing devices, a selected portion of content to redact in a first online meeting. The method may further include determining, via the one or more computing devices, if a participant of the first online meeting is in an un-trusted location. The method may also include, in response to determining that the participant of the first online meeting is in the un-trusted location, redacting, via the one or more computing devices, the selected portion of content from content available to the participant in the first online meeting.

One or more of the following features may be included. The method may include defining the selected portion of content to redact based upon, at least in part, one or more highlighted areas of the content. The method may also include defining the selected portion of content to redact based upon, at least in part, one or more graphical elements selected from the content. The method may additionally include defining the selected portion of content to redact based upon, at least in part, one or more regular expressions. Further, the method may include redacting a plurality of instances of the selected portion of content from content available to the participant in the online meeting. Moreover, the method may include redacting content from a second online meeting based upon, at least in part, the portion of content selected to be redacted from content available to the participant in the first online meeting.

In an implementation, method may include receiving an indication from the participant that the participant is in the un-trusted location. Determining if the participant of the first online meeting is in the un-trusted location may be based upon, at least in part, a defined policy and a history of un-trusted locations. The content available to the participant in the first online meeting may be viewable in a window and the portion of content to redact is selectable from the window. The selected portion of content may be redacted at a server computer associated with the online meeting prior to making the content available to the participant at a client electronic device.

In an embodiment, a computer program product may reside on a computer readable storage medium and may have a plurality of instructions stored on it. When executed by a processor, the instructions may cause the processor to perform operations including receiving a selected portion of content to redact in a first online meeting. The operations may further include determining if a participant of the first online meeting is in an un-trusted location. The operations may also include, in response to determining that the participant of the first online meeting is in the un-trusted location, redacting the selected portion of content from content available to the participant in the first online meeting.

One or more of the following features may be included. The operations may include defining the selected portion of content to redact based upon, at least in part, one or more highlighted areas of the content. The operations may also include defining the selected portion of content to redact based upon, at least in part, one or more graphical elements selected from the content. The operations may additionally include defining the selected portion of content to redact based upon, at least in part, one or more regular expressions. Further, the operations may include redacting a plurality of instances of the selected portion of content from content available to the participant in the online meeting. Moreover, the operations may include redacting content from a second online meeting based upon, at least in part, the portion of content selected to be redacted from content available to the participant in the first online meeting.

In an implementation, operations may include receiving an indication from the participant that the participant is in the un-trusted location. Determining if the participant of the first online meeting is in the un-trusted location may be based upon, at least in part, a defined policy and a history of un-trusted locations. The content available to the participant in the first online meeting may be viewable in a window and the portion of content to redact is selectable from the window. The selected portion of content may be redacted at a server computer associated with the online meeting prior to making the content available to the participant at a client electronic device.

In an embodiment, a computing system is provided. The computing system may include at least one processor and at least one memory architecture coupled with the at least one processor. The computing system may also include a first software module executable by the at least one processor and the at least one memory architecture, wherein the first software module may be configured to receive a selected portion of content to redact in a first online meeting. Further, the computing system may include a second software module which may be configured to determine if a participant of the first online meeting is in an un-trusted location. Additionally, the computing system may include a third software module which may be configured to redact the selected portion of content from content available to the participant in the first online meeting. The third software module may, in response to determining that the participant of the first online meeting is in the un-trusted location, redact the selected portion of content from content available to the participant in the first online meeting.

One or more of the following features may be included. The computing system may include a fourth software module which may be configured to define the selected portion of content to redact based upon, at least in part, one or more highlighted areas of the content. Moreover, the computing system may include a fifth software module which may be configured to define the selected portion of content to redact based upon, at least in part, one or more graphical elements selected from the content. Further, the computing system may include a sixth software module which may be configured to define the selected portion of content to redact based upon, at least in part, one or more graphical elements selected from the content.

In an embodiment, a method may include receiving, via one or more computing devices, a selected portion of content to redact from content available to a participant in a first online meeting, from a content owner. The content available to the participant in the first online meeting may be viewable to the content owner in a single window. The selected portion of content to redact may be selectable by the content owner from the single window. The method may also include defining, via the one or more computing devices, the selected portion of content to redact based upon, at least in part, at least one of: one or more highlighted areas of the content, one or more graphical elements selected from the content, and one or more regular expressions, received from the content owner. The method may additionally include determining, via the one or more computing devices, if a participant of the first online meeting is in an un-trusted location. Further, the method may include, in response to determining that the participant of the first online meeting is in the un-trusted location, redacting, via the one or more computing devices, the selected portion of content from content available to the participant in the first online meeting.

The details of one or more implementations are set forth in the accompanying drawings and the description below. Other features and advantages will become apparent from the description, the drawings, and the claims.

DETAILED DESCRIPTION OF THE INVENTION

Figure 1:
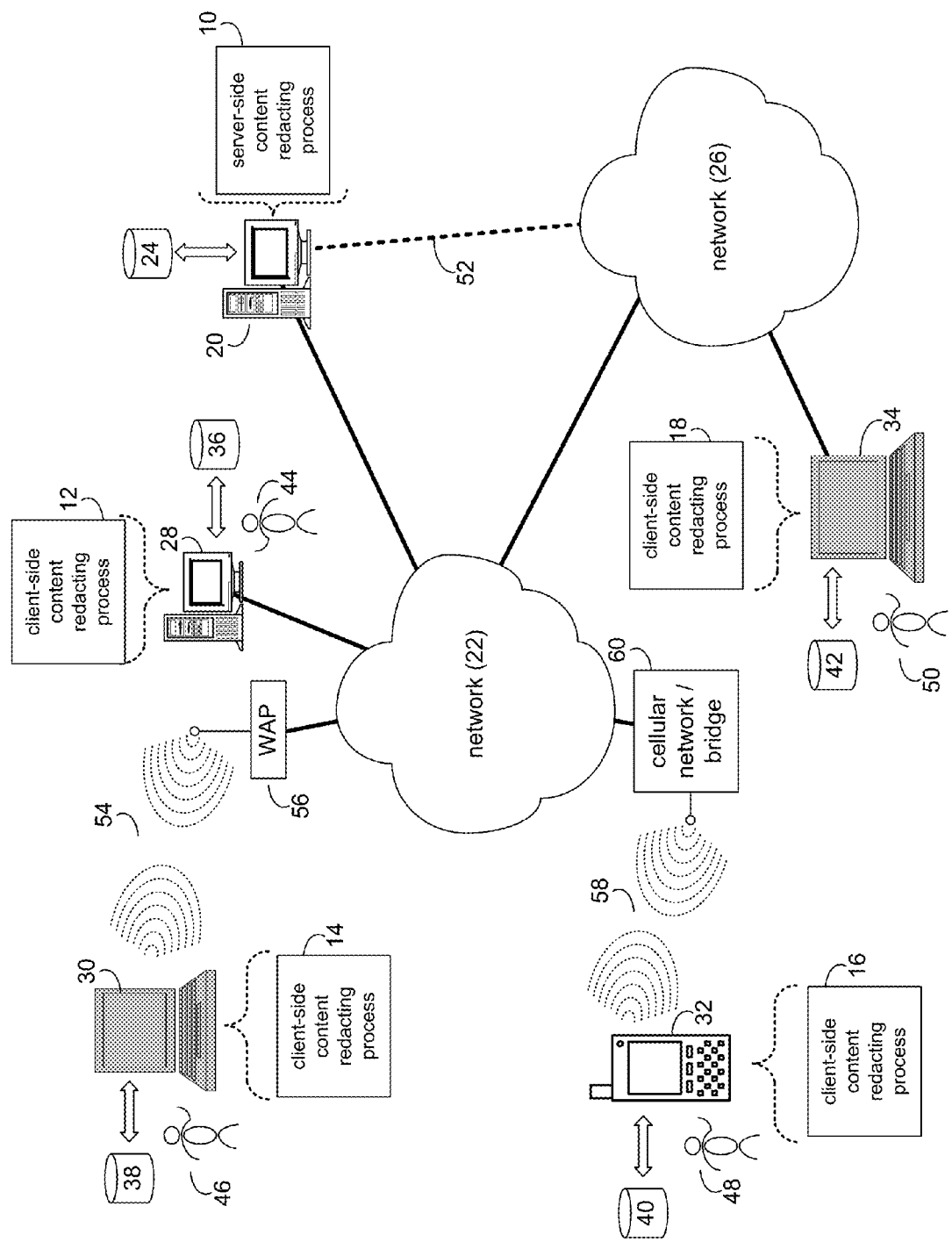
FIG. 1 is a diagrammatic view of a content redacting process coupled to a distributed computing network.
Figure 2:
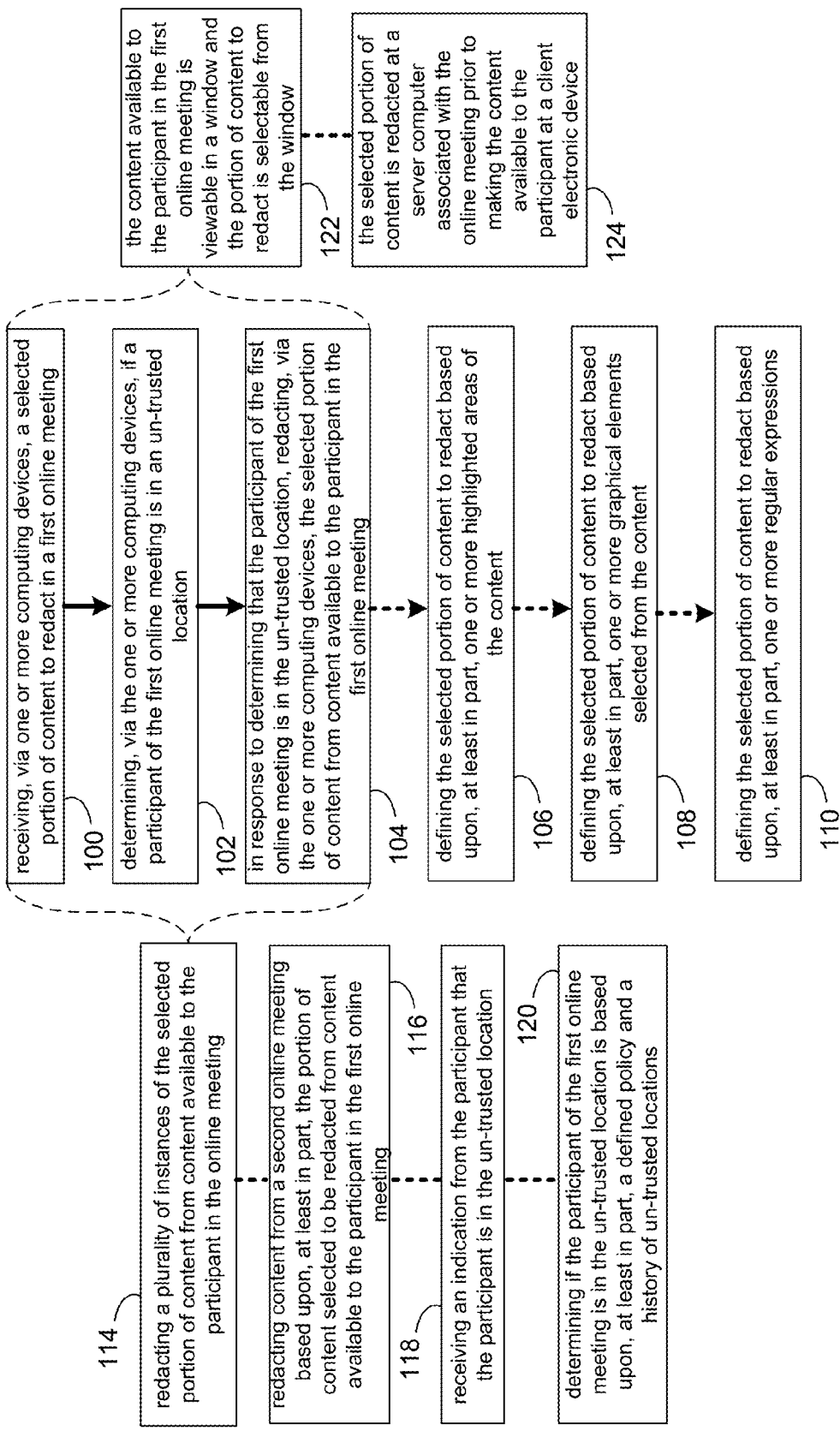
FIG. 2 is a flowchart of the content redacting process of FIG. 1.

Referring to FIGS. 1 & 2, there is shown a content redacting process 10. As will be discussed below, content redacting process 10 may receive 100, a selected portion of content to redact in a first online meeting. Content redacting process 10 may also determine 102 if a participant of the first online meeting is in an un-trusted location. Content redacting process 10 may additionally, in response to determining that the participant of the first online meeting is in the un-trusted location, redact 104 the one or more computing devices, the selected portion of content from content available to the participant in the first online meeting.

The content redacting (CR) process may be a server-side process (e.g., server-side CR process 10), a client-side process (e.g., client-side CR process 12, client-side CR process 14, client-side CR process 16, or client-side CR process 18), or a hybrid server-side/client-side process (e.g., the combination of server-side CR process 10 and one or more of client-side CR processes 12, 14, 16, 18).

Server-side CR process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows Server; Novell Netware; or Red Hat Linux, for example.

The instruction sets and subroutines of server-side CR process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS, Novell Web Server, or Apache Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Additionally, server computer 20 may execute an online meeting product, examples of which may include, but are not limited to, Lotus® Sametime® Meetings, LotusLive™ Meetings, or GoToMeeting®. Network 22 may be connected to one or more secondary networks (e.g., network 26), examples of which may include but are not limited to: a local area network; a wide area network; or an intranet, for example.

Client-side CR processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft® Windows® CE, Red Hat® Linux, Apple® Mac OS®, Apple® iOS, Google Android™, or a custom operating system.

The instruction sets and subroutines of client-side CR processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side CR processes 12, 14, 16, 18 and/or server-side CR process 10 may be processes that run within (i.e., are part of) a unified communications and collaboration application (e.g., Lotus® Sametime® and/or LotusLive™ Meetings Mobile). Alternatively, client-side CR processes 12, 14, 16, 18 and/or server-side CR process 10 may be stand-alone applications that work in conjunction with the unified communications and collaboration application application. One or more of client-side CR processes 12, 14, 16, 18 and server-side CR process 10 may interface with each other (via network 22 and/or network 26).

Users 44, 46, 48, 50 may access server-side CR process 10 directly through the device on which the client-side CR process (e.g., client-side CR processes 12, 14, 16, 18) is executed, namely client electronic devices 28, 30, 32, 34, for example. Users 44, 46, 48, 50 may access server-side CR process 10 directly through network 22 and/or through secondary network 26. Further, server computer 20 (i.e., the computer that executes server-side CR process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Content Redacting (Cr) Process

For the following discussion, server-side CR process 10 will be described for illustrative purposes. It should be noted that client-side CR process 12 may be incorporated into server-side CR process 10 and may be executed within one or more applications that allow for communication with client-side CR process 12. However, this is not intended to be a limitation of this disclosure, as other configurations are possible (e.g., stand-alone, client-side CR processes and/or stand-alone server-side CR processes.) For example, some implementations may include one or more of client-side CR processes 12, 14, 16, 18 in place of or in addition to server-side CR process 10.

Referring now to FIGS. 1-4, one or more of users 44, 46, 48, and 50 may be participants in an online meeting (e.g., meeting 400). Meeting 400 may be conducted via a unified communications and collaboration application (e.g., Lotus® Sametime® and/or LotusLive™ Meetings Mobile). Meeting 400 may be a meeting, presentation, or other type of collaborative gathering. Further, meeting 400 may be attended online, and content (e.g., content 304) associated with meeting 400 may be made available and/or viewable to one or more meeting participants (e.g., one or more of users 44, 46, 48, 50).

Content 304 viewable to participants (e.g., one or more of users 44, 46, 48, 50) of meeting 400 may be created by a content owner (e.g., user 44). The content owner (e.g., user 44) may create, edit, and/or otherwise have access to the content (e.g., content 304) via graphical user interface 302. Graphical user interface (GUI) 302 may be associated with the unified communications and collaboration application (e.g., Lotus® Sametime® and/or LotusLive™ Meetings Mobile) and may be available to the content owner (e.g., user 44) via a client electronic device (e.g., client electronic devices 28, 30, 32, 34) associated with the content owner (e.g., user 44).

Content associated with meeting 400 may also be accessed by a meeting participant (e.g., user 46) via a GUI associated with the unified communications and collaboration application. For example, user 46 may enter meeting 400 and may access meeting content via GUI 402. GUI 402 may include one or more windows through which user 46 may access presentation material associated with meeting 400. For example, GUI 402 may include content window 404 through which user 46 may access presentation content (e.g., content 304). Presentation content which user 46 may access through content window 404 may include, but is not limited to, presentation video, presentation slides, presentation documents, pictures, a shared whiteboard, or other presentation information or visual collaborative technology. GUI 402 may be available to the participant (e.g., user 46) via a client electronic device (e.g., client electronic devices 28, 30, 32, 34) associated with the participant (e.g., user 46). In an example, user 46 may access content 304 via content window 404 of GUI 402 by way of, at least in part, client electronic device 30, which may be in a public location such as, for example, an airport, train station, or hotel lobby. Content 304 may also be available to one or more of users 44, 46, 48, 50 via a web browser and/or web application associated with the unified communications and collaboration application.

Content 304 may include sensitive information and/or data. If accessed by, e.g., user 46 in a public location, the sensitive information and/or data in content 304 may be displayed on a screen viewable to user 46 in the public location. As such, the sensitive information and/or data may be viewable to members of the public or those who otherwise do not have permission to view it. The content owner, e.g., user 44, may not want to risk leaving the sensitive information and/or data open to the public. The content owner's (e.g., user 44) options may include denying user 46 access to any of content 304, in which case user 46 will be unable to participate in meeting 400. It may be desirable for user 44 to provide content 304 to user 46 without the sensitive information and/or data.

CR process 10 may receive 100 a selected portion (e.g., one or more of portions 306, 308, 310, 312, 314) of content (e.g., content 304) to redact in a first online meeting (e.g., meeting 400). GUI 302, which may be associated with a unified communications and collaboration application, may allow the content owner (e.g., user 44) to select one or more portions of content (e.g., content 304) to redact in meeting 400. The one or more portions (e.g., portions 306, 308, 310, 312, 314) selected by the content owner (e.g., user 44) to redact may include sensitive information and/or data that the content owner (e.g., user 44) does not want to risk making available in a public location (e.g., an airport, train station, and/or hotel lobby), which may be an un-trusted location. The content (e.g., content 304) available to the participant (e.g., user 46) in the first online meeting (e.g., meeting 400) may be (122) viewable in a window (e.g., GUI 302) and the portion (e.g., one or more of portions 306, 308, 310, 312, 314) of content (e.g., content 304) to redact may be selectable from the window (e.g., GUI 302). CR process 10 may allow, via GUI 302 for example, the content owner (e.g., user 44) to select the one or more portions (e.g., portions 306, 308, 310, 312, 314) of content (e.g., content 304) to redact, in a variety of ways.

For example, CR process 10 may allow user 44 to highlight a portion (e.g., portion 306) of content (e.g., content 304) to redact in the online meeting (e.g., meeting 400). User 44 may highlight portion 306 via, e.g., cursor 316 in order to indicate that user 44 wishes to redact portion 306 of content 304 in the online meeting (e.g., meeting 400). In an implementation, user 44 may right-click on the highlighted portion (e.g., portion 306), and, in response, CR process 10 may render popup-menu 318. User 44 may select, for example "Redact", via pop-up menu 318, which may indicate that user 44 wishes to redact the highlighted portion (e.g., portion 306) of content (e.g., content 304) when providing content 304 to participants in un-trusted locations. CR process 10 may define 106 the selected portion (e.g., portion 306) of content (e.g., content 304) to redact based upon, at least in part, one or more highlighted areas (e.g., portion 306) of the content 304. For example, in response to receiving user 44's selection of portion 306, CR process 10 may define 106 portion 306 of content 304 as content to redact in the online meeting (e.g., meeting 400). In this way, CR process 10 may allow a content owner (e.g., user 44) to select a 2-D range of a slide or other content that includes sensitive and/or confidential information and/or data for redaction prior to it being sent to a un-trusted location.

Further, CR process 10 may allow user 44 to select a graphical element (e.g., graphical element 320) as content to redact in the online meeting (e.g., meeting 400). In an implementation, user 44 may click on graphical element 320 via, e.g., cursor 316 in order to indicate that user 44 wishes to redact graphical element 320 of content 304 in the online meeting (e.g., meeting 400). CR process 10 may define 108 the selected portion (e.g., graphical element 320) of content (e.g., content 304) to redact based upon, at least in part, one or more graphical elements (e.g., graphical element 320) selected from the content (e.g., content 304). For example, in response to receiving user 44's selection of graphical element 320, e.g., by user 44 clicking on graphical element 320, CR process 10 may define 108 graphical element 320 of content 304 as content to redact in the online meeting (e.g., meeting 400).

Additionally, CR process 10 may allow user 44 to select one or more portions (e.g., portions 308, 310, 312, and 314) of content (e.g., content 304) to redact in the online meeting (e.g., meeting 400) using a regular expression program. A regular expression program may be a program that allows for matching text and/or strings of text, or particular characters, words, or patterns of characters. In an implementation, user 44 may enter one or more characters (e.g., "sal*") in field 322, which may be available via GUI 302, to match via a regular expression program. User 44 may select button 324 to indicate that user 44 wishes to redact one or more portions (e.g., portions 308, 310, 312, and 314) of content 304 that are matched to "sal*" via the regular expression program. CR process 10 may define 110 the selected portion (e.g., portions 308, 310, 312, and 314) of content (e.g., content 304) to redact based upon, at least in part, one or more regular expressions. For example, in response to receiving user 44's indication that user 44 wishes to redact one or more portions (e.g., portions 308, 310, 312, and 314) of content 304 that are matched to "sal*" (e.g., "sale", "sales") via the regular expression program, CR process 10 may define 110 portions 308, 310, 312, and 314 of content 304 as content to redact in the online meeting (e.g., meeting 400). In this way, CR process 10 may allow a content owner (e.g., user 44) to select a pattern of content that appears several times in a set of slides, and includes sensitive and/or confidential information and/or data, for redaction prior to it being sent to an un-trusted location.

CR process 10 may also determine 102 if a participant (e.g., user 46) of the first online meeting (e.g., meeting 400) is in an un-trusted location. For example, CR process 10 may receive 118 an indication (e.g., via radio button 408) from the participant (e.g., user 46) that the participant (e.g., user 46) is in the un-trusted location. In an implementation, user 46 may select radio button 408 via e.g., GUI 402, which may indicate to CR process 10 that user 46 is in an un-trusted location (e.g., a public location such as an airport, train station, and/or hotel lobby). If user 46 is in a trusted location, user 46 may select radio button 406 via, e.g., GUI 402, to indicate that user 46 is in the trusted location. Based on one or more options set by the content owner (e.g., user 44), CR process 10 may require user 46 to indicate whether or not user 46 is in a trusted or un-trusted location prior allowing user 46 to enter the online meeting (e.g., meeting 400). While it has been described above that user 46 may indicate whether or not user 46 is in a trusted or un-trusted location via one or more radio buttons (e.g., radio buttons 406, 408), this discussion is for exemplary purposes only as CR process 10 may allow user 46 to indicate whether or not user 46 is in a trusted or un-trusted location in a variety of ways. For example, CR process 10 may provide a popup-window asking if user 46 is in a trusted or un-trusted location when user 46 attempts to enter the online meeting (e.g., meeting 400).

Moreover, in an implementation, determining 102 if the participant (e.g., user 46) of the first online meeting (e.g., meeting 400) is in an un-trusted location may be (120) based upon, at least in part, a defined policy and a history of un-trusted locations. For example, CR process 10 may automatically determine whether participants are in trusted locations or not. A policy management system may enforce an organization policy and/or rules for one or more meeting participants. For example, if a client electronic device used by a participant to access the meeting is outside of an internal network, and if the meeting is deemed to have sensitive and/or confidential information involved, the participant may automatically be determined to be in an un-trusted location. In another example, CR process 10 may obtain an IP address associated with the client electronic device and determine a location of the client electronic device based upon, at least in part, the IP address. Further, CR process 10 may perform a lookup in a database of trusted and un-trusted locations of an organization to determine if the location is trusted or un-trusted. For example, a location in Boston may be deemed trusted, however a location in Philadelphia may be deemed un-trusted based upon, at least in part, a history of participants accessing meeting content from those places. If, for example, user 46 was in an airport in Detroit, identified a potential security issue, and indicated that user 46 was in an un-trusted location, when user 48 is in the airport in Detroit the following week, CR process 10 may deem that user 48 is also in an un-trusted location when user 48 goes to access content for an online meeting from that location. Further, in an implementation, senior employees may be permitted to decide on their own whether or not they are in a trusted location, whereas CR process 10 may automatically determine for junior employees whether or not they are in a trusted location, using one of the features described above.

Additionally, in an implementation, CR process 10 may implement a differential security policy such that content sent to trusted locations is non-encrypted, and content sent to un-trusted locations is encrypted. For example, CR process 10 may determine that user 46 is likely trying to access meeting content from within a corporate LAN, and therefore may not encrypt the meeting content before sending it to user 46. Also, CR process 10 may determine that user 46 is likely trying to access meeting content from outside the corporate LAN, and therefore may encrypt the meeting content before sending it to user 46. The degree of encryption used by CR process 10 may be proportional to the likelihood that user 46 is outside the corporate LAN, and a level of risk involved that is determined by CR process 10.

Figure 3:
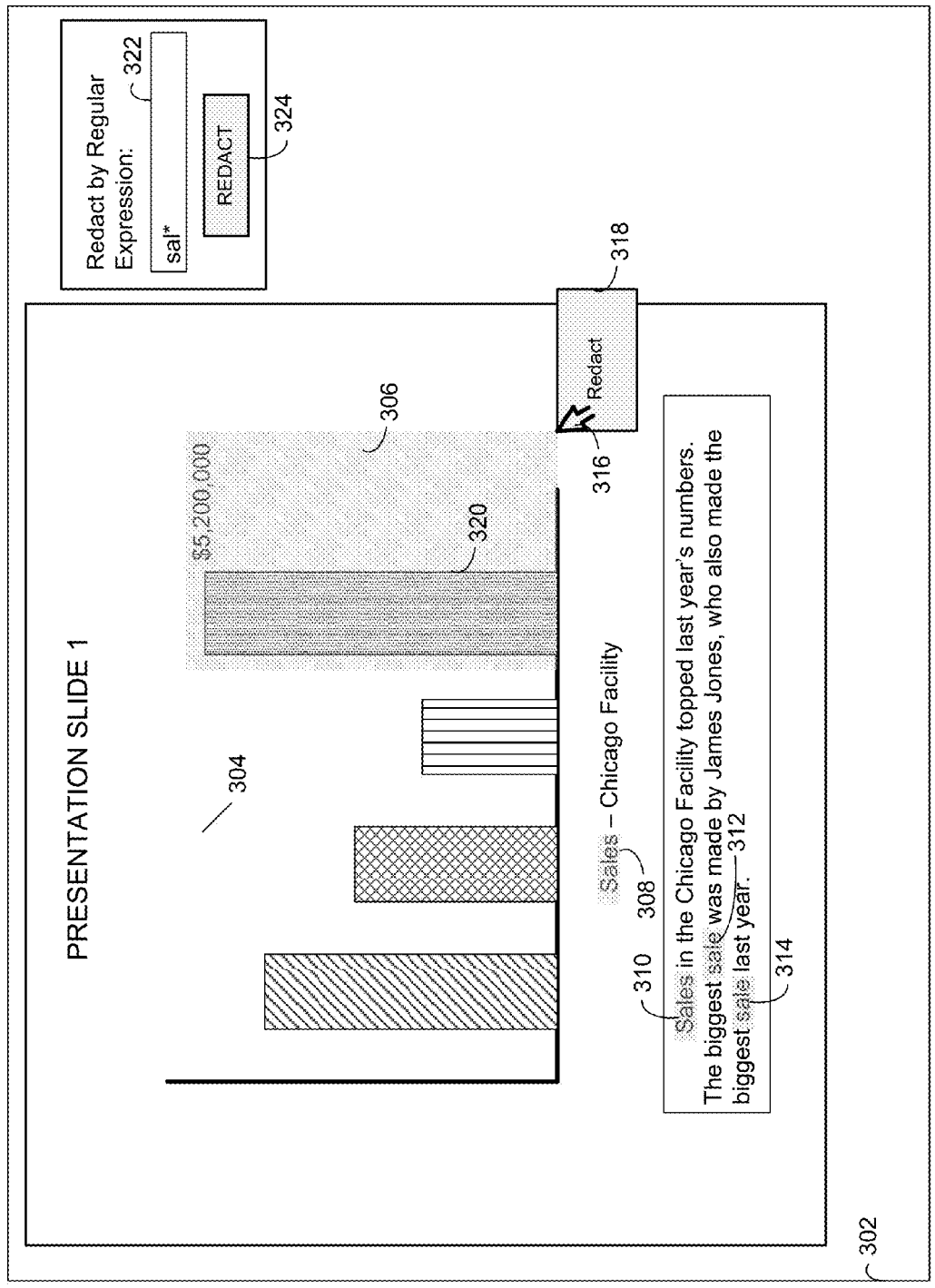
FIG. 3 is an exemplary graphical user interface which may be associated with the content redacting process of FIG. 1.
Figure 4:
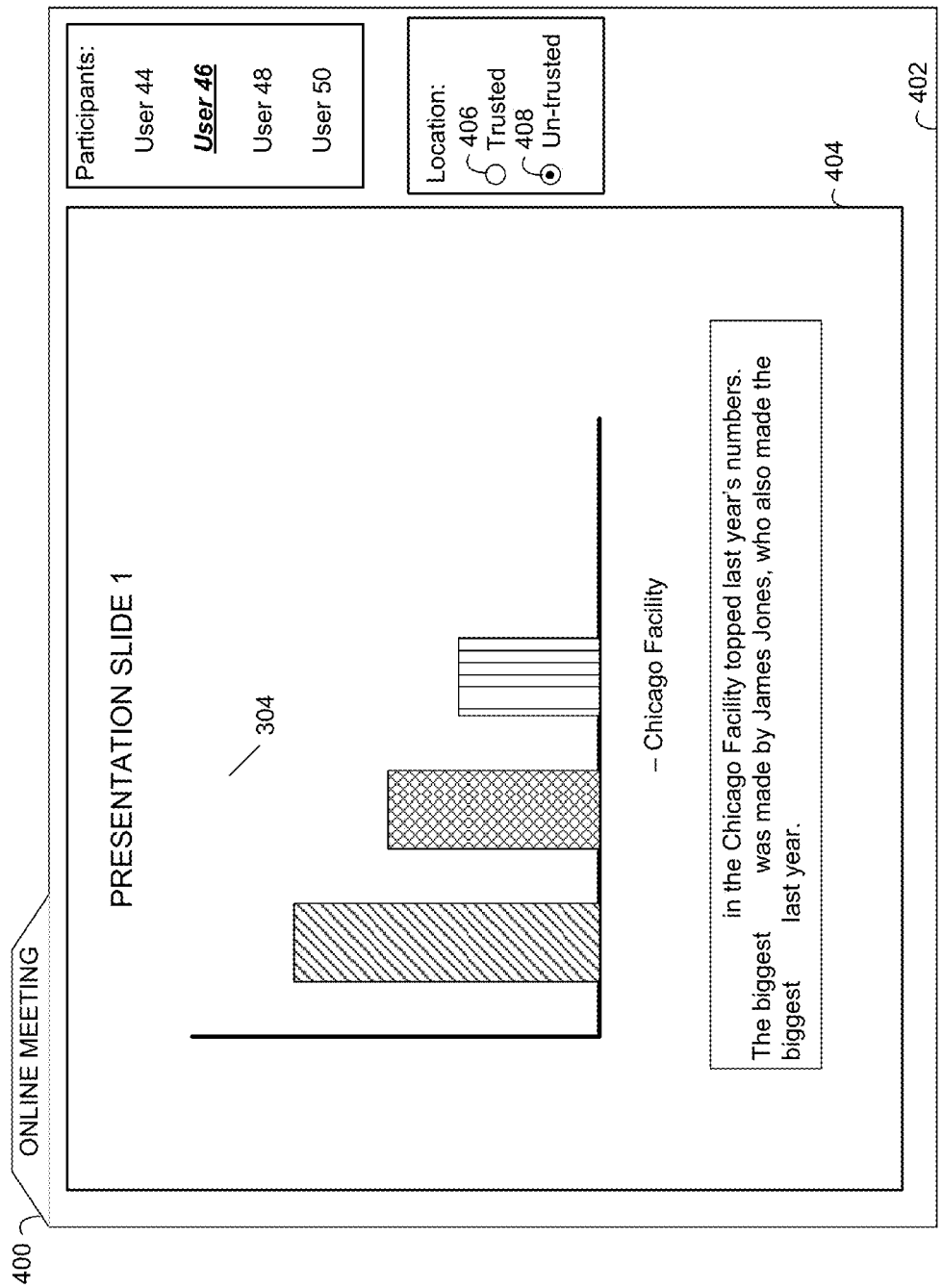
FIG. 4 is also an exemplary graphical user interface which may be associated with the content redacting process of FIG. 1.

In response to determining 102 that the participant (e.g., user 46) of the first online meeting (e.g., meeting 400) is in the un-trusted location, CR process 10 may redact 104 the selected portion (e.g., one or more of portions 306, 308, 310, 312, 314) of content (e.g., content 304) from content available to the participant (e.g., user 46) in the first online meeting (e.g., meeting 400). As shown in FIGS. 3 & 4, if the content owner (e.g., user 44) has selected portion 306 of content 304, CR process 10 may redact portion 306 from content 304 available to user 46 in meeting 400. This may be indicated by the lack of portion 306 appearing in content window 404. Further, if user 44 has selected one or more portions (e.g., portions 308, 310, 312, and 314) of content (e.g., content 304) to redact in the online meeting (e.g., meeting 400) using the regular expression program, CR process 10 may redact one or more of portions 308, 310, 312, and 314 from content 304 available to user 46 in meeting 400. This may be indicated by the lack of portions 308, 310, 312, and 314 appearing in content window 404. Additionally, if user 44 has selected one or more graphical elements (e.g., graphical element 320) of content (e.g., content 304) to redact in the online meeting (e.g., meeting 400), CR process 10 may redact graphical element 320 from content 304 available to user 46 in meeting 400. This may be indicated by the lack graphical element 320 appearing in content window 404. While portion 306 is shown in FIG. 3 to include graphical element 320, it should be noted that user 44 may select graphical element 320 by highlighting the portion shown as portion 306 in FIG. 3, or may select graphical element 320 on its own as described above.

Further, while it has been discussed above that one or more of portions 306, 308, 310, 312, 314 and/or graphical element 320 of content 304 may be selected by the content owner (e.g., user 44), it should be noted that this discussion is for exemplary purposes only and does not limit the content that may be selected for redaction. For example, using one or more of the features described above, a content owner (e.g., user 44) may also select an entire slide or a set of slides, e.g., by highlighting, or by selecting slides or a set of slides from a slide list, for redaction. Further, the content owner, e.g., user 44 may select a pattern of content for redaction, e.g., using a regular expression program, as discussed above.

Figure 5:
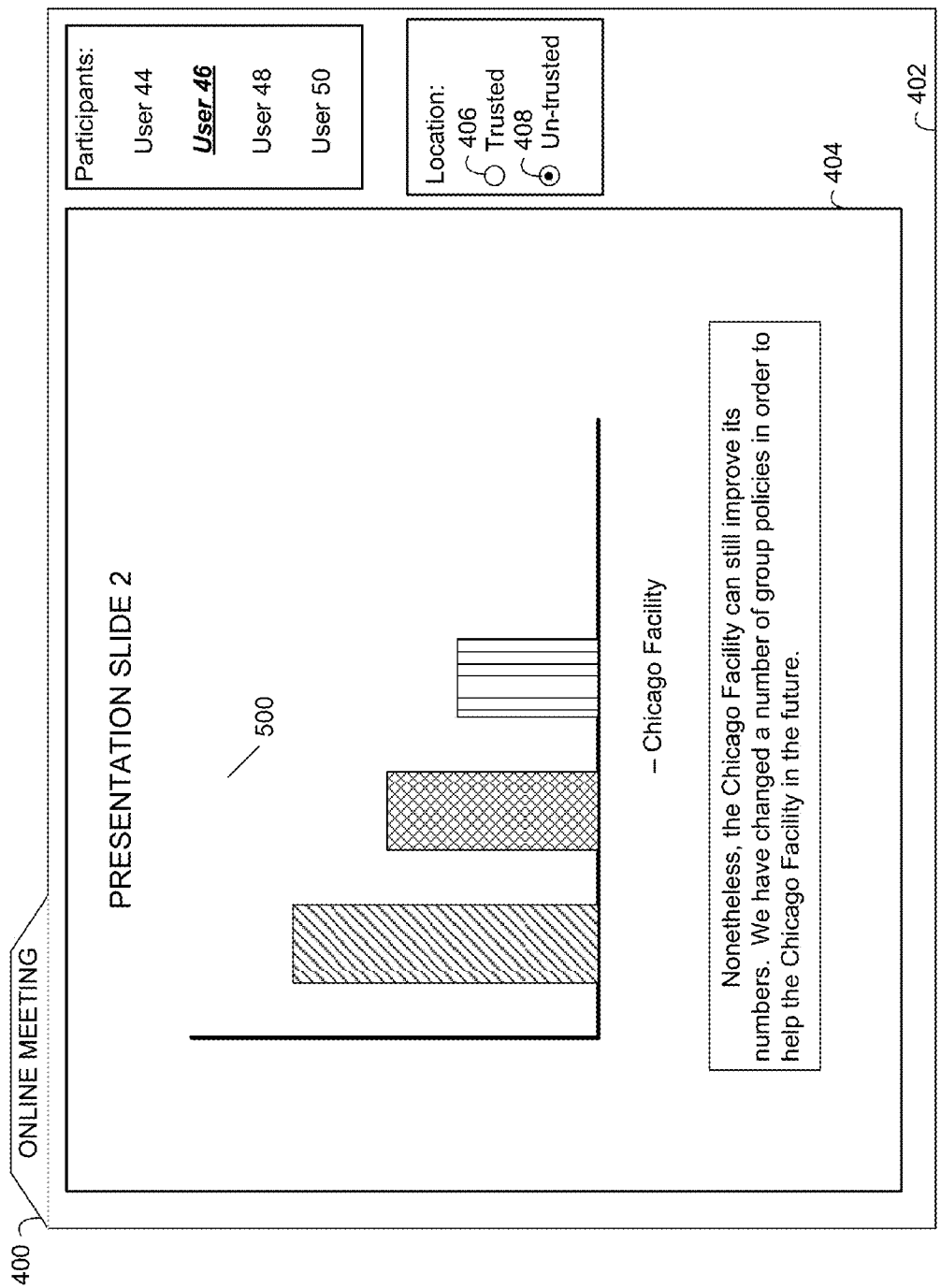
FIG. 5 is also an exemplary graphical user interface which may be associated with the content redacting process of FIG. 1.

Referring now also to FIG. 5, CR process 10 may redact 114 a plurality of instances of the selected portion (e.g., one or more of portions 306, 308, 310, 312, 314) of content from content (e.g., content 304, 500) available to the participant (e.g., user 46) in the online meeting (e.g., online meeting 400). As discussed above, CR process 10 may redact the selected portion (e.g., portion 306, 308, and/or graphical element 320) of content (e.g., 304) from content window 404 available to user 46 via GUI 402 in online meeting 400. As shown in FIG. 3, content 304 may be "Presentation Slide 1" and may include an instance of portion 306, 308, and/or graphical element 320. As shown in FIG. 5, content 500 may be "Presentation Slide 2" and may also be part of online meeting 400. Content 500 may also be viewable to user 46 via content window 404 of GUI 402. Content 500 may also include portions 306, 308, and/or graphical element 320, however, CR process may redact portions 306, 308, and/or graphical element 320 from content (e.g., content 500) available to the participant (e.g., user 46) in the online meeting (e.g., meeting 400), as the content owner (e.g., user 44) selected these portions for redaction in connection with content 304. In other words, if desired by user 44, CR process 10 may allow user 44 to select an option (not shown) to redact all instances of the selected portion (e.g., selected portions 306, 308, and/or graphical element 320) from all content (e.g., content 304 and/or content 500) available to user 46 during meeting 400 if user 46 is in an un-trusted location. In this way, CR process 10 may allow user 44 to redact all instances of sensitive content from content available to a user in an un-trusted location by selecting one instance of the sensitive content via GUI 302.

Figure 6:
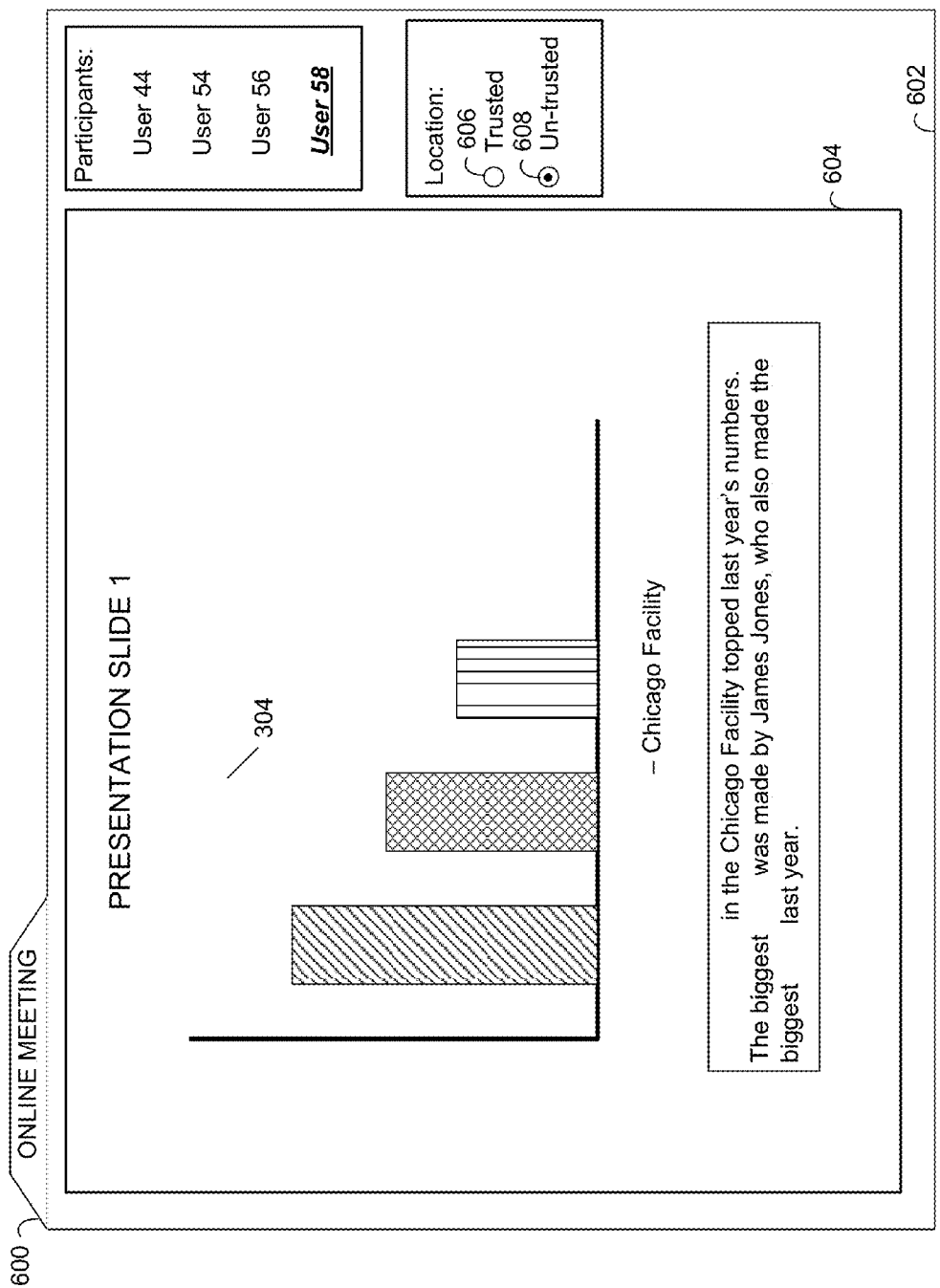
FIG. 6 is also an exemplary graphical user interface which may be associated with the content redacting process of FIG. 1.

Referring now also to FIG. 6, CR process 10 may redact 116 content from a second online meeting (e.g., meeting 600) based upon, at least in part, the portion of content selected (e.g., portions 306, 308, 310, 312, 314, and/or graphical element 320) to be redacted from content (e.g., content 304) available to the participant (e.g., user 46) in the first online meeting (e.g., meeting 400). As shown in FIG. 6, user 44 may give the same presentation in meeting 600 to users 54, 56, and 58 as user 44 gave to users 46, 48, and 50 in meeting 400. CR process 10 may allow user 44 to save redaction selections and/or settings so they may be applied to a subsequent meeting (e.g., meeting 600) without user 44 having to select the portions to redact again. In meeting 600, user 58 may indicate that user 58 is in a trusted or un-trusted location by selecting either button 606 or button 608, respectively. As such, if desired by the content owner (e.g., user 44), CR process 10 may redact portions 306, 308, 310, 312, 314, and/or graphical element 320 from content 304 available to e.g., user 58, via content window 604 of GUI 602 in meeting 600, if user 58 selects button 608 to indicate that user 58 is in an un-trusted location.

Figure 7:
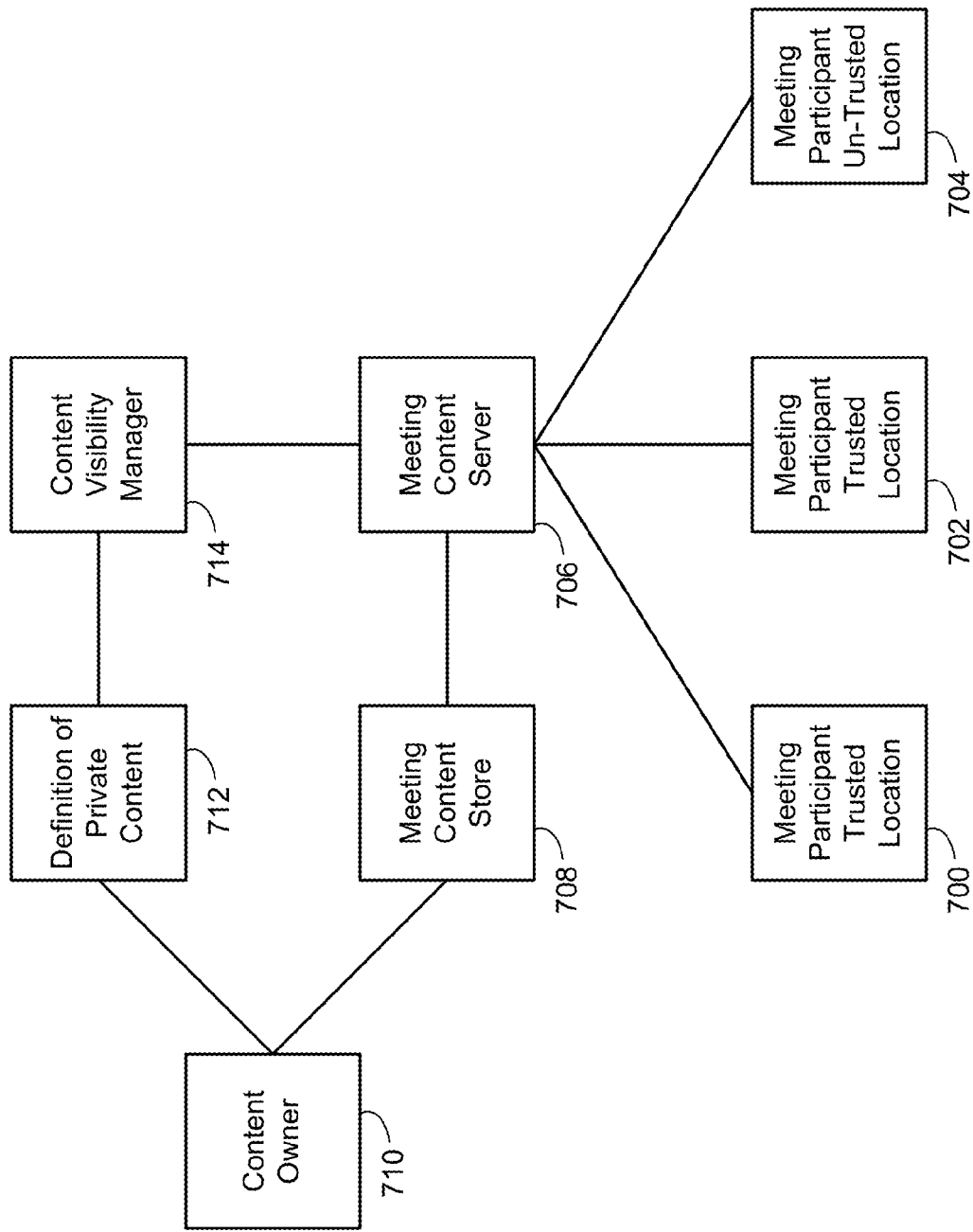
FIG. 7 is in exemplary architecture which may be associated with the content redacting process of FIG. 1.

In an implementation, the selected portion (e.g., one or more of portions 306, 308, 310, 312, 314) of content (e.g., content 304) may be (124) redacted at a server computer (e.g., server computer 20) associated with the online meeting (e.g., meeting 400) prior to making the content (e.g., content 304) available to the participant (e.g., user 46) at a client electronic device (e.g., client electronic device 30). Referring now also to FIG. 7, in an implementation, CR process 10 may allow meeting participants to join online meetings (e.g., meeting 400, 600) from a trusted location (e.g., trusted locations 700, 702) and from an un-trusted location (e.g., un-trusted location 704). Participants (e.g., one or more of users 44-58) may view meeting content (e.g., content 304, 500) through a web browser and/or web application associated with a unified communications and collaboration application. While attempting to enter the online meeting (e.g., meeting 400, 600), participants (e.g., users 44-58) may indicate whether they in a trusted location (e.g., trusted locations 700, 702) or an un-trusted location (e.g., un-trusted location 704). A server computer or meeting content server (e.g., meeting content server 706) may be responsible for rendering content (e.g., content 304, 500) for each participant (e.g., users 44-58). Meeting content server 706 may retrieve meeting content (e.g., content 304, 500) from meeting content store 708. Meeting content store 708 may be provided the meeting content by the content owner (e.g., content owner 710).

Meeting content server 706 may query content visibility manager 714 as it renders meeting content (e.g., content 304, 500) for one or more of the meeting participants (e.g., users 44-58). Content visibility manager 714 may use definition of private content 712 to redact content selected by the content owner (e.g., using one or more of the features described above) before allowing meeting content server 706 to render meeting content (e.g., content 304, 500) for one or more of the meeting participants (e.g., users 44-58) based upon, at least in part, whether or not they are determined to be in a trusted location (e.g., trusted locations 700, 702) or an un-trusted location (e.g., un-trusted location 704). Definition of private content 712 may be based upon, at least in part, one or more selections of portions of content to redact made by the content owner, as described above. Content visibility manager 714, which may include a filter engine, may direct meeting content server 706 to provide portions of content selected as sensitive (i.e., to be redacted) only to participants in trusted locations. In other words, the selected portions of content, e.g., the sensitive content, may not be sent to un-trusted locations at all. In this way, CR process 10 may prevent network snooping of the sensitive information in an un-trusted network. The filter engine of content visibility manager 714 may allow new filter capabilities to be added, which may allow CR process 10 to extend functionality of the content visibility manager.

In an implementation, content owner 710 may supply the meeting content and definition of private content 712 in a format supported by content visibility manager 714 (e.g., XML). During the online meeting, meeting content server 706 and content visibility manager 714 may interact to retrieve and render meeting content based upon, at least in part, the location of participants. Content visibility manager 714 may filter the sensitive formation before providing the meeting content to un-trusted locations.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
receiving, via one or more computing devices, a selected portion of content to redact in a first online meeting;
determining, via the one or more computing devices, if a participant of the first online meeting is in an un-trusted location, wherein the participant of the first online meeting is at least one participant of a plurality of participants of the first online meeting, wherein the first online meeting is a single meeting accessed by the plurality of participants via a collaboration application;
in response to determining that the participant of the first online meeting is in the un-trusted location, redacting, via the one or more computing devices, the selected portion of content from content available to the participant in the first online meeting to generate a redacted version of the content; and
providing, via the one or more computing devices, in real-time during the first online meeting, the redacted version of the content to the participant in the un-trusted location and providing a non-redacted version of the content of the first online meeting to remaining participants of the first online meeting, wherein all of the content of the first online meeting and the redacted selected portion of content are provided directly from a single source, wherein the redacted selected portion of content provided to the participant in the un-trusted location is encrypted, wherein a degree of encryption is based upon, at least in part, a level of risk associated with the un-trusted location;
wherein determining whether the location is trusted or un-trusted is based upon, at least in part, a location change of the one or more computing devices.

2. The method of claim 1, further comprising:
defining the selected portion of content to redact based upon, at least in part, one or more highlighted areas of the content.

3. The method of claim 1, further comprising:
defining the selected portion of content to redact based upon, at least in part, one or more graphical elements selected from the content.

4. The method of claim 1, further comprising:
defining the selected portion of content to redact based upon, at least in part, one or more regular expressions.

5. The method of claim 1, further comprising:
redacting a plurality of instances of the selected portion of content from content available to the participant in the online meeting.

6. The method of claim 1, further comprising:
redacting content from a second online meeting based upon, at least in part, the portion of content selected to be redacted from content available to the participant in the first online meeting.

7. The method of claim 1, further comprising:
receiving an indication from the participant that the participant is in the un-trusted location.

8. The method of claim 1, wherein determining if the participant of the first online meeting is in the un-trusted location is based upon, at least in part, a defined policy and a history of un-trusted locations.

9. The method of claim 1, wherein the content available to the participant in the first online meeting is viewable in a window and the portion of content to redact is selectable from the window.

10. The method of claim 1, wherein the selected portion of content is redacted at a server computer associated with the online meeting prior to making the content available to the participant at a client electronic device.

11. A computer program product residing on a non-transitory computer readable storage medium having a plurality of instructions stored thereon, which, when executed by a processor, cause the processor to perform operations comprising:
receiving, via one or more computing devices, a selected portion of content to redact in a first online meeting;
determining, via the one or more computing devices, if a participant of the first online meeting is in an un-trusted location, wherein the participant of the first online meeting is at least one participant of a plurality of participants of the first online meeting, wherein the first online meeting is a single meeting accessed by the plurality of participants via a collaboration application;
in response to determining that the participant of the first online meeting is in the un-trusted location, redacting, via the one or more computing devices, the selected portion of content from content available to the participant in the first online meeting to generate a redacted version of the content; and
providing, via the one or more computing devices, in real-time during the first online meeting, the redacted version of the content to the participant in the un-trusted location and providing a non-redacted version of the content of the first online meeting to remaining participants of the first online meeting, wherein all of the content of the first online meeting and the redacted selected portion of content are provided directly from a single source, wherein the redacted selected portion of content provided to the participant in the un-trusted location is encrypted, wherein a degree of encryption is based upon, at least in part, a level of risk associated with the un-trusted location;
wherein determining whether the location is trusted or un-trusted is based upon, at least in part, a location change of the one or more computing devices.

12. The computer program product of claim 11, further comprising:
defining the selected portion of content to redact based upon, at least in part, one or more highlighted areas of the content.

13. The computer program product of claim 11, further comprising:
defining the selected portion of content to redact based upon, at least in part, one or more graphical elements selected from the content.

14. The computer program product of claim 11, further comprising:

defining the selected portion of content to redact based upon, at least in part, one or more regular expressions.

15. The computer program product of claim 11, further comprising:
redacting a plurality of instances of the selected portion of content from content available to the participant in the online meeting.

16. The computer program product of claim 11, further comprising:
redacting content from a second online meeting based upon, at least in part, the portion of content selected to be redacted from content available to the participant in the first online meeting.

17. The computer program product of claim 11, further comprising:
receiving an indication from the participant that the participant is in the un-trusted location.

18. The computer program product of claim 11, wherein determining if the participant of the first online meeting is in the un-trusted location is based upon, at least in part, a defined policy and a history of un-trusted locations.

19. The computer program product of claim 11, wherein the content available to the participant in the first online meeting is viewable in a window and the portion of content to redact is selectable from the window.

20. The computer program product of claim 11, wherein the selected portion of content is redacted at a server computer associated with the online meeting prior to making the content available to the participant at a client electronic device.

21. A computing system comprising:
at least one processor;
at least one memory architecture coupled with the at least one processor;
a first software module executable by the at least one processor and the at least one memory architecture, wherein the first software module is configured to receive a selected portion of content to redact in a first online meeting;
a second software module executable by the at least one processor and the at least one memory architecture, wherein the second software module is configured to determine if a participant of the first online meeting is in an un-trusted location, wherein the participant of the first online meeting is at least one participant of a plurality of participants of the first online meeting, wherein the first online meeting is a single meeting accessed by the plurality of participants via a collaboration application;
a third software module executable by the at least one processor and the at least one memory architecture, wherein the third software module is configured to, in response to determining that the participant of the first online meeting is in the un-trusted location, redact the selected portion of content from content available to the participant in the first online meeting to generate a redacted version of the content; and
a fourth software module executable by the at least one processor and the at least one memory architecture, wherein the fourth software module is configured to provide, in real-time during the first online meeting, the redacted version of the content to the participant in the un-trusted location and providing a non-redacted version of the content of the first online meeting to remaining participants of the first online meeting, wherein all of the content of the first online meeting and the redacted selected portion of content are provided directly from a single source, wherein the redacted selected portion of content provided to the participant in the un-trusted location is encrypted, wherein a degree of encryption is based upon, at least in part, a level of risk associated with the un-trusted location;
wherein determining whether the location is trusted or un-trusted is based upon, at least in part, a location change of the one or more computing devices.

22. The computing system of claim 21, further comprising:
a fifth software module executable by the at least one processor and the at least one memory architecture, wherein the fifth software module is configured to define the selected portion of content to redact based upon, at least in part, one or more highlighted areas of the content.

23. The computing system of claim 21, further comprising:
a sixth software module executable by the at least one processor and the at least one memory architecture, wherein the sixth software module is configured to define the selected portion of content to redact based upon, at least in part, one or more graphical elements selected from the content.

24. The computing system of claim 21, further comprising:
a seventh software module executable by the at least one processor and the at least one memory architecture, wherein the seventh software module is configured to define the selected portion of content to redact based upon, at least in part, one or more regular expressions.

25. A method comprising:
receiving, via one or more computing devices, a selected portion of content to redact from content available to a participant in a first online meeting, from a content owner, wherein the content available to the participant in the first online meeting is viewable to the content owner in a single window, and wherein the selected portion of content to redact is selectable by the content owner from the single window;
defining, via the one or more computing devices, the selected portion of content to redact based upon, at least in part, at least one of: one or more highlighted areas of the content, one or more graphical elements selected from the content, and one or more regular expressions, received from the content owner;
determining, via the one or more computing devices, if the participant of the first online meeting is in an un-trusted location, wherein the participant of the first online meeting is at least one participant of a plurality of participants of the first online meeting, wherein the first online meeting is a single meeting accessed by the plurality of participants via a collaboration application;
in response to determining that the participant of the first online meeting is in the un-trusted location, redacting, via the one or more computing devices, the selected portion of content from content available to the participant in the first online meeting to generate a redacted version of the content; and
providing, via the one or more computing devices, in real-time during the first online meeting, the redacted version of the content to the participant in the un-trusted location and providing a non-redacted version of the content of the first online meeting to remaining participants of the first online meeting, wherein all of the content of the first online meeting and the redacted selected portion of content are provided directly from a single source, wherein the redacted selected portion of content provided to the participant in the un-trusted location is encrypted, wherein a degree of encryption is based upon, at least in part, a level of risk associated with the un-trusted location;

wherein determining whether the location is trusted or un-trusted is based upon, at least in part, a location change of the one or more computing devices.

* * * * *